C. W. E. CLARKE.
COOLING TOWER.
APPLICATION FILED OCT. 28, 1916.
1,235,291.
Patented July 31, 1917.
2 SHEETS—SHEET 1.
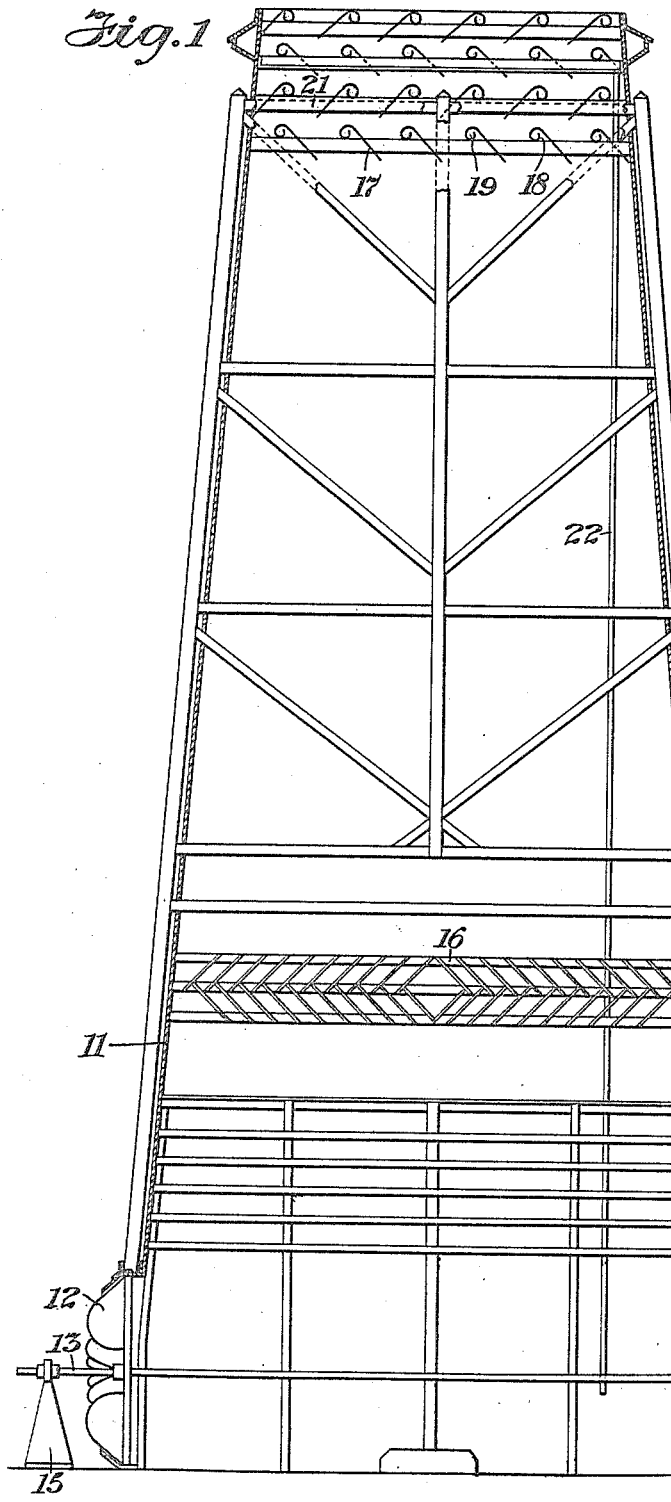
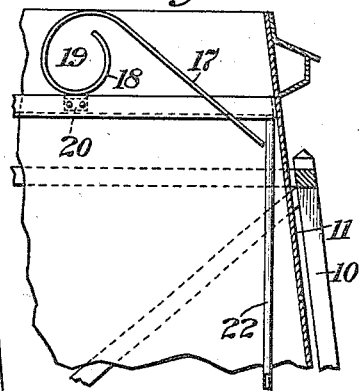
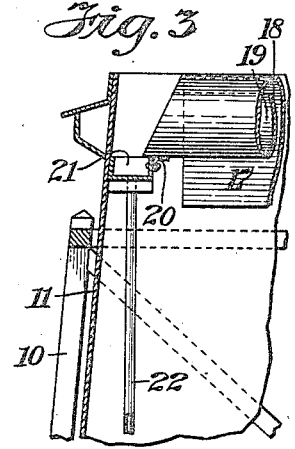
INVENTOR
Charles W. E. Clarke
BY
HIS ATTORNEYS

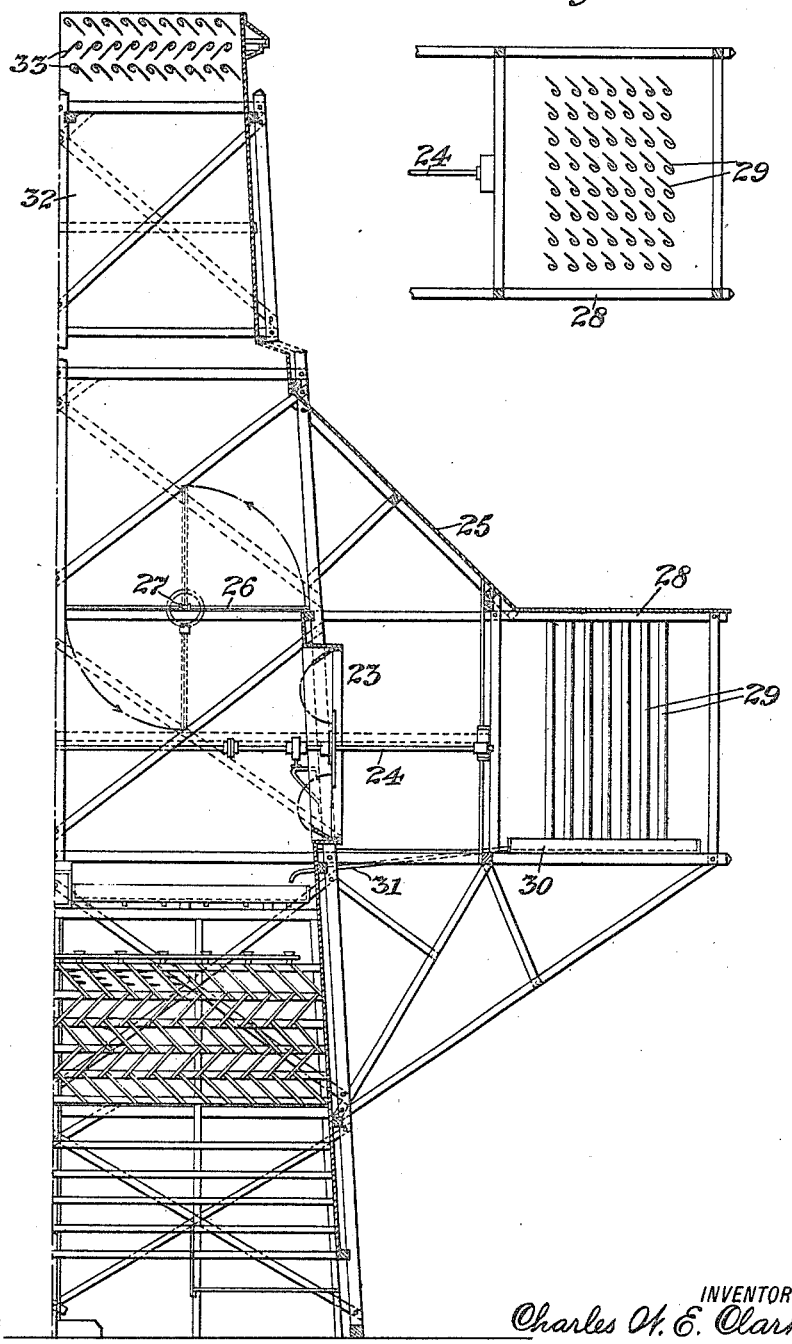

UNITED STATES PATENT OFFICE.

CHARLES W. E. CLARKE, OF BROOKLINE, MASSACHUSETTS.

COOLING-TOWER.

1,235,291.　　　　　　Specification of Letters Patent.　　Patented July 31, 1917.

Application filed October 28, 1916. Serial No. 128,158.

*To all whom it may concern:*

Be it known that I, CHARLES W. E. CLARKE, a citizen of the United States, residing at Brookline, in the county of Suffolk and State of Massachusetts, have invented an Improvement in Cooling - Towers, of which the following is a specification.

This invention relates to cooling towers employed in systems for condensing steam, and more particularly to spray catcher devices employed in these cooling towers. In many places, as is now generally known, it is necessary for economy to employ cooling towers in order that the water employed for condensing the steam may be used over and over again. The necessary cooling of the water for effecting the condensation of the steam is due to radiation, absorption and evaporation, but the feature of evaporation is the much more important one. To accomplish the necessary evaporation to lower the temperature of the water, the heated water is subjected to currents of air, either by natural draft or by forced draft. The temperature of the air being lower than that of the water, some of the condensing water will pass into the form of vapor, thereby absorbing the heat of the water by evaporation and consequently reducing the temperature of the water. Common experience with water cooling towers of this class has demonstrated that the currents of air cause large quantities of spray to be carried from the top of the tower to the atmospheric air and lost, and it is obvious that the efficiency of the tower is naturally reduced by and through this loss. By the term spray as herein employed I mean water which is held in suspension in the air as the same leaves the tower. I am aware that heretofore various devices, for example, wire mesh placed at an inclination in the tower, have been suggested and used as spray catchers, but so far as has come to my knowledge, none of these proposed spray catchers have retained any material percentage of the spray.

The object of my present invention therefore is the provision of a spray catching apparatus employed in a cooling tower and so constructed as to retain practically all the spray which would otherwise escape.

In carrying out my invention, I prefer to employ a series of spray catchers placed in the cooling tower and each comprising a sheet metal plate having a spray catching portion and a portion for receiving and returning the spray to a tray or other suitable receptacle from which the retained spray is returned to the tank or pond at the base of the tower, as will be hereinafter more particularly described.

In the drawings,

Figure 1 is a diagrammatic sectional elevation of a water cooling tower fitted with my improved spray catcher.

Fig. 2 is a sectional elevation taken lengthwise of a spray catcher.

Fig. 3 is a similar view showing one end of a spray catcher, Figs. 2 and 3 being made on a materially larger scale for the purpose of clearness and illustration, Fig. 4 is a diagrammatic sectional elevation illustrating another form of cooling tower in which my improved spray catching devices may be employed, and Fig. 5 is a partial plan of the spray catching devices as shown in the extension in Fig. 4.

Referring to the drawings, 10 indicates the frame of a cooling tower which supports the shell 11 adapted to inclose the tower, this frame and shell being made of any suitable material and in any desired manner. The tower is mounted upon a tank or over a reservoir and adjacent its base is provided on opposite sides with fans 12 mounted on a shaft 13 which is journaled in bearings 14 supported upon standards 15, the fans being employed to create a forced draft, and as will be understood need not be used when the temperature is sufficiently low for a natural draft to effect a cooling of the water to the required temperature on passing through the tower. Also as is customary, the tower is fitted with cooling surfaces 16 which may be made of mats of suitable wire mesh or corrugated sheet metal plates or any other cooling surfaces commonly known in the cooling tower art. The tower also includes a suitable water distributing system for conveying the water to be cooled to the several cooling surfaces. These features however form no part of my present invention.

As hereinbefore stated, this invention relates to spray catching devices situated in the cooling tower to prevent the escape of the spray with the air and to return the spray to the tower so as to prevent the losses in the water occasioned by the escaping spray. To this end, in the cooling tower I provide series of spray catchers placed in rows and suitably secured in position. The spray catchers in each row thereof extend across the tower and in the construction shown in Fig. 1 in alternate rows the spray catchers are similarly placed while in intermediate rows the spray catchers are oppositely placed, so that the superimposed spray catchers are in a staggered relationship, to effectually catch the spray as the air currents leave the tower. It will be understood however I do not limit myself to this particular arrangement as others may be employed with equal effect. Each of these spray catchers, as shown in Fig. 2, is preferably made of sheet steel or other material and comprises a straight portion 17 adapted to catch the spray, and a curved or other portion 18 forming a trough 19 into which the spray is forced and conveyed to one end of the spray catcher and delivered to a tray or other receptacle 21 from which the water so retained may be returned to the base of the tower by a drain pipe 22, or in any other manner.

Each spray catcher is secured in position by a cross support piece 20 suitably secured in the shell or frame of the tower. The straight portions of the spray catchers are preferably set at an angle of about 45° and each spray catcher is so placed that the trough member thereof is at a slight inclination so as to insure the flow of the water toward and into the tray 21.

By referring to Figs. 4 and 5, it will be seen that the spray catching devices made and used in accordance with my present invention may be applied to the form of water cooling tower shown and described in Letters Patent, No. 1181644, granted to me May 2, 1916. In this form of tower the fan or blower 23 is placed above the water distributing system and is mounted on a shaft 24 suitably journaled and driven by any form of power. At the side of the tower a housing is provided to accommodate the fan and its mountings, and also to provide a by-pass 25 around the door 26 which is hinged to turn as indicated at 27 so that when this door is in the dotted line position the tower may be employed under a natural draft, whereas when the door is closed as shown in the full line positions, the tower is operated under a forced draft created by the fan. On the fan side of the tower there may also be provided an extension 28 in which spray catchers as hereinbefore described may be mounted and suitably secured in place in vertical positions as shown in these figures of the drawing. These spray catchers are indicated at 29, and are adapted to return the water to the bottom of the extension, wherein for this purpose there is located a tank or other receptacle 30 from which this water is returned by a pipe 31, or otherwise to the distributing trough in the cooling tower or by a pipe to the tank or pool at the base of the tower as shown in Fig. 1. In Fig. 4 the top of the tower comprising the flue portion is indicated at 32, in the upper part of which there are spray catchers 33 similar in all respects to same devices hereinbefore described in connection with Figs. 1, 2, and 3.

While I have herein shown and described my improved spray catcher as composed of sheet metal having a straight portion at one end and a curved portion forming a trough at the other end, it will be understood that I do not limit myself to this particular material or this peculiar shape of spray catcher, as other materials and conformations may be employed with equal advantage without departing from the nature and spirit of my invention.

I claim as my invention:

1. In a cooling tower and in combination with the shell and water cooling surfaces thereof, a plurality of baffles each comprising a sheet metal plate placed at an inclination to the direction of the travel of the air currents and having a straight portion at its inner end and a portion turned under at its outer end forming a trough by which the spray is returned to the tower.

2. In a cooling tower and in combination with the shell and water cooling surfaces thereof, a series of baffles extending across the tower in superimposed rows, the baffles in alternate rows being placed in similar positions while the baffles in intermediate rows are placed in similar oppositely disposed positions so that adjacent sets of superimposedly placed baffles are in staggered positions, each baffle comprising a spray catcher portion at one end and a spray returner portion at the other end.

3. In a cooling tower and in combination with the shell and water cooling surfaces thereof, a series of baffles extending across the tower in superimposed rows, the baffles in alternate rows being placed in similar positions while the baffles in intermediate rows are placed in similar oppositely disposed positions so that adjacent sets of superimposedly placed baffles are in staggered positions, each baffle comprising a spray catcher portion at one end and a spray returner portion at the other end, a tray into which the said spray returner portions of the baffles discharge, and means for returning the water from said tray to the lower end of the tower.

4. In a cooling tower and in combination with the shell and water cooling surfaces thereof, a series of baffles placed in rows extending across the tower, each baffle comprising a sheet metal plate straight at one end and curved at the other end to form a trough by which the spray is returned to the tower.

5. In a cooling tower and in combination with the shell and water cooling surfaces thereof, a series of baffles each comprising a sheet metal plate straight at one end and curved to form a trough at the opposite end, the said baffles being placed in superimposed rows extending across the tower, the baffles in alternate rows being placed in similar positions while the baffles in intermediate rows are placed in similar oppositely disposed positions so that adjacent sets of superimposedly placed baffles are in staggered positions.

Signed by me this 24th day of October, 1916.

CHARLES W. E. CLARKE.